(12) United States Patent
Solyanik et al.

(10) Patent No.: US 6,312,609 B1
(45) Date of Patent: Nov. 6, 2001

(54) WATER PURIFICATION DEVICE

(75) Inventors: Rostislav Solyanik, deceased, late of Ordgonikidze (UA), by heiress, Zinaida Solyanik; Kari Aalto, Tampere (FI); Alexander Melnikov; Valery Antipov, both of Simferopol (UA)

(73) Assignee: Nerox Filter Oy, Tampere (FI)

( * ) Notice: Subject to any disclaimer, the term of this patent is extended or adjusted under 35 U.S.C. 154(b) by 0 days.

(21) Appl. No.: 08/793,874

(22) PCT Filed: Aug. 10, 1995

(86) PCT No.: PCT/FI95/00422
§ 371 Date: Mar. 12, 1997
§ 102(e) Date: Mar. 12, 1997

(87) PCT Pub. No.: WO96/08446
PCT Pub. Date: Mar. 21, 1996

(30) Foreign Application Priority Data

Sep. 15, 1994 (FI) .......................................................... 944287

(51) Int. Cl.$^7$ ................................ C02F 1/00; B01D 63/08
(52) U.S. Cl. ................... 210/767; 210/232; 210/321.75; 210/461; 210/462; 210/486; 210/490
(58) Field of Search ............................. 210/416.1, 416.3, 210/445, 460, 461, 477, 483, 484, 489, 495, 232, 238, 317, 323.1, 343, 344, 321.75, 321.84, 459, 462, 486, 490, 346, 767

(56) References Cited

U.S. PATENT DOCUMENTS

| 740,365 | * | 9/1903 | Knight ................................. 210/486 |
| 3,730,353 | * | 5/1973 | Trasen et al. ......................... 210/455 |
| 4,046,699 | * | 9/1977 | Zine, Jr. . |
| 4,422,546 | * | 12/1983 | Charity . |
| 4,759,857 | | 7/1988 | Acuna . |
| 4,804,469 | * | 2/1989 | Walsh . |
| 5,256,288 | * | 10/1993 | Lee . |
| 5,427,014 | * | 6/1995 | Von Der Becke et al. ........... 99/337 |
| 5,613,424 | * | 3/1997 | Chameroy et al. .................... 99/337 |
| 5,701,805 | * | 12/1997 | Sa ...................................... 99/403 X |

FOREIGN PATENT DOCUMENTS

| 0 237 673 | 9/1987 | (EP) . |
| 0 508 645 | 10/1992 | (EP) . |
| 10515 | of 1845 | (GB) . |
| 2824 | of 1860 | (GB) . |
| 1-224016 | 9/1989 | (JP) . |

* cited by examiner

Primary Examiner—Matthew O. Savage
(74) Attorney, Agent, or Firm—Connolly Bove Lodge & Hutz (57) ABSTRACT

The water purification device includes at least a purification unit and a pipe unit. The water purification device is intended for purification of water being particularly in a storage, such as a container, a reservoir, a vessel or the like, by immersing the same at least partly into the water existing in the storage and by leading water away from the storage preferably from above into a collecting container placed essentially underneath the purification unit. A pipe connected to the purification unit is arranged to lead water by means of syphon principle, by influence of syphon pressure caused by the difference between the height of the purification unit and the collecting container. The filtering means include at least one thin filtering film, preferably made of plastic-based material, such as PTM (Particle Trade Membrane), TeM (track-etch Membrane) or the like, the thickness of which is preferably 7–25 micrometers and the size of pores is 0.05–10 micrometers.

8 Claims, 7 Drawing Sheets

TABLE A

| sample | date | time h | colour mg Pt/l | turbid. NTU | Fe mg/l | mFC cfu/100 ml |
|---|---|---|---|---|---|---|
| INFL initial | 23.8.94 | 12.15 | 100 | 0,6 | 2,8 | 5700 |
| INFL surface | 23.8.94 | 15.15 | 25 | 1,4 | 0,63 | ND |
| EFFL | 23.8.94 | 15.15 | 5 | 0,07 | 0,04 | 23 |
| EFFL | 24.8.94 | 8.30 | 5 | 0,07 | 0,01 | 0 |
| EFFL | 24.8.94 | 14.30 | 5 | 0,03 | 0,01 | 0 |
| EFFL | 25.8.94 | 8.00 | 5 | 0,05 | 0,01 | 0 |

FIG. 6a

TABLE B

FIG. 6b

TABLE C

| sample | date | time h | colour mg Pt/l | turbid. NTU | Fe mg/l | mFC cfu/100 ml |
|---|---|---|---|---|---|---|
| INFL initial | 23.8.94 | 12.15 | 100 | 0,6 | 2,8 | 5700 |
| INFL surface | 23.8.94 | 15.15 | 25 | 1,4 | 0,63 | ND |
| EFFL | 23.8.94 | 15.15 | 5 | 0,08 | 0,04 | 0 |
| EFFL | 24.8.94 | 8.30 | 5 | 0,07 | 0,03 | 0 |
| EFFL | 24.8.94 | 14.30 | 5 | 0,03 | 0,01 | 0 |
| EFFL | 25.8.94 | 8.00 | 5 | 0,05 | 0,01 | 0 |

FIG. 7a

TABLE D

FIG. 7b

WATER PURIFICATION DEVICE

FIELD OF THE INVENTION

The invention relates to a water purification device, including at least a purification unit used to purify water and a pipe unit to lead water. The water purification device is intended for purification of water being particularly in a storage, such as a container, a reservoir, a vessel or a like, by immersing of the same at least partly into the water present in the storage and by leading water away from the storage preferably from above into a collecting container placed essentially underneath the purification unit. The purification unit contains at least filtering means for purifying of water and an auxiliary frame for supporting the same. The pipe unit contains at least one preferably flexible pipe, conduit or the like connected to the purification unit or the auxiliary frame, that is arranged to lead water by means of syphon principle, by influence of syphon pressure caused by the difference of height of the purification unit and the collecting container.

BACKGROUND OF THE INVENTION

Nowadays it is possible to use as a water purification device described above, that may easily be applied for most heterogenous circumstances, such as a minor housekeeping use or for especially demanding or difficult circumstances, an active carbon filter, that can be placed at the end of a supply pipe or on top of a jug. The above type of filters, usually intended for purifying drinking water, have lately become remarkably common particularly because of the increasing amount of allergies and pollution of environment. Water produced by the water distribution system, which as such satisfies the requirements of law, contains materials, such as carbonate and chlorine, which have not been known to have any influence on health, but which influence on the taste of water. It is possible to eliminate this kind of materials effectively particularly with the kind of active carbon filters described above. In addition to this with such filters it is also possible to reduce heavy metals, such as lead and possibly bacteria to some extent.

This kind of an active carbon filter, when applied in connection with a jug, is used for example so, that in the beginning it is kept immersed in water for a certain length of time, for example 15 minutes. Then the filter is placed on top of the jug, where-after the upper part of a hopper existing in the filter is filled with water, that may flow by itself through the filter into the jug underneath of the same. The filter must be kept in connection with the jug in such a way, that it remains continuously wet. In case the filter gets dry, the above treatment for a new filter must be repeated.

The types of filters described above reduce very effectively chlorine and organic compounds, that have an influence on the taste and the smell of water. However, the filters in question are not able to eliminate reliably enough a general problem concerning particularly demanding circumstances, that is bacteria from water intended for drinking. In respect with bacteria the type of filters have also such a problem involved, that the active carbon inside the filter in principle acts as a good substrate for the bacteria. This is why usually small silver flakes have been used in the filtering substance in addition to the active carbon to prevent bacteria reformulation.

Another notable problem related to the use of active carbon filters is that, controlling of the functional efficiency of the filter is impossible. That is why the filter must be replaced as a whole with a new one after a period of usage determined by guideline values. The reason for this is, that the filtering capacity of the active carbon filter depends both on the quality of the water to be used and on the amount of water led through it. As a general guideline, the filtering amount of water with this kind of active carbon filters is usually defined to be 60–100 liters and the exchange period is 3–4 weeks, whereafter the active carbon filter is unusable and must be replaced.

With active carbon filters of corresponding type, that may be placed at the end of a supply pipe, another problem is involved in addition to the one above, that is caused by pressure of the water distribution system. Usually the pressure in a water distribution system is very high, so that certain constructions must be applied in such filters used at the end of the supply pipe whereby water passes slowly enough through the filter to make possible a concrete result with the filtration.

Generally, the functional reliability and safety of the type of disposable active carbon filters described above are insufficient for certain purposes particularly because of the inadequate bacteria separation ability. Furthermore the functional capacity, that may not be controlled in any way, may decrease in certain circumstances very rapidly, whereby they may even make the quality of water worse, because of the bacteria formulation taking place in the filter.

On the one hand so called ceramic filters are known to be used as filters, also, that are intended for stationary placement in connection with supply pipes correspondingly as above. This kind of solutions is not particularly suitable for housekeeping purposes, because of the relatively big size and the high price of the same, nor to be used in primitive circumstances, either, because of the modern fitting procedures with standardized constructions. On the other hand there are nowadays on the markets certain types of manually or by syphon principle operating water purifiers equipped with ceramic filter parts.

This kind of a purifier includes a filter made of porous ceramic tube, that is immersed into unclean water. Water, that is purified while passing through the filter, is led with a flexible output pipe away from the unclean water container from above into for example, a suitable collecting container. The manual purifier includes a pressure cylinder equipped with a driving handle, wherein by pumping of the same a large enough negative pressure is affected inside the ceramic tube, by influence of which the above process starts and continues until the pumping is interrupted. A purifier functioning by syphon principle enables a self operated and a continuous purification by utilizing the syphon pressure caused by the height difference between the water container and the collecting place.

The purifiers described herein are heavy and large because of the use of the ceramic filter and furthermore they do not fulfill the requirements concerning difficult circumstances as far as manufacturing costs and functional reliability are concerned. Utilizing syphon principle in connection with a ceramic filter is also not particularly profitable, which is due to the high pressure drop, that is typical for a ceramic filter. Because of the high resistance of flow, the output of this type of a purifier is usually about 1 l/h, which requires furthermore usually a height difference of about at least 2 m. The increase of the output capacity requires thus the increase of the height difference or use of several parallel purifiers at the same time. Furthermore particularly the use of a manual purifier requires rather uncomfortable activities in the sense of ergonometry to keep the purification process going on.

Thus nowadays there are no water purifiers on the markets, that would suit to most heterogenous circumstances, be profitable by the acquisition or functional costs, be technically easy to utilize, operate effectively enough, and eliminate particularly bacteria in all kinds of circumstances reliably enough.

SUMMARY OF THE INVENTION

It is an aim of the water purification device according and elimination of the problems presented above to thereby to this invention to achieve a decisive improvement raise substantially the level of knowledge in this field. To achieve this purpose, the water purification device according to this invention is primarily characterized in that the filtering means include at least one thin filtering film, preferably made of plastic based material, such as PTM (Particle Track Membrane), TeM (Track-etch Membrane) or the like, the thickness of which is preferably 7–25 micrometers and the size of pores is 0.05–10 micrometers.

As the most important advantages of the water purification device according to the invention can be mentioned the simplicity and reliability of its construction and use, which matters are crucial demands for achieving reliable purification results particularly, when producing drinking water in demanding circumstances. The water purification device is inexpensive to manufacture, because of its simple construction. In addition to that, it is also advantageous in practice due to the fact, that the same water purification device may be used continuously again and again, because the filtering part may be easily cleaned. The water purification device is very safe in practice, because, when advantageously applying syphon principle, the quality of the purified water running by itself and continuously to the collecting container is always homogenous regardless of the operating time of the device. This is due to the fact, that the water purification device equipped with for example a thin PTM or TeM filtering film does not in any stage pass components bigger than a certain particle size, whereby, when the filtering film clogs up only the penetration speed of the filter decreases and, when not cleaned up the functioning of the filter may be totally interrupted. Despite of this the device may be used again with extremely simple activities, by opening the device and cleaning the filtering film.

In the following description, the invention is illustrated in detail while referring to the appended drawings, in which

DETAILED DESCRIPTION OF THE PREFERRED EMBODIMENTS

Water purification device according to the invention includes at least a purification unit 1 used to purify water and a pipe unit 2 to lead water. The water purification device is intended for purification of water being particularly in a storage 3, such as a container, a reservoir, a vessel or the like, by immersing the same at least partly into the water existing in the storage 3 and by leading water away from the storage 3 preferably from above into a collecting container K placed essentially underneath the purification unit 1. In this case the purification unit 1 contains at least filtering means 1a for purifying of water and an auxiliary frame 1b for supporting the same. The pipe unit 2 contains correspondingly at least one preferably flexible pipe 2a, conduit or the like connected to the purification unit 1 or the auxiliary frame 1b, that is arranged to lead water by means of syphon principle, that is by influence of syphon pressure caused by the difference of height H between the purification unit 1 and the collecting container K. The filtering means 1a include at least one thin filtering film 1a', preferably made of plastic based material, such as PTM (Particle Track Membrane), TeM (Track-etch Membrane) or the like, the thickness of which is preferably 7–25 micrometers and the size of pores is 0.05–10 micrometers.

Figure 5A:
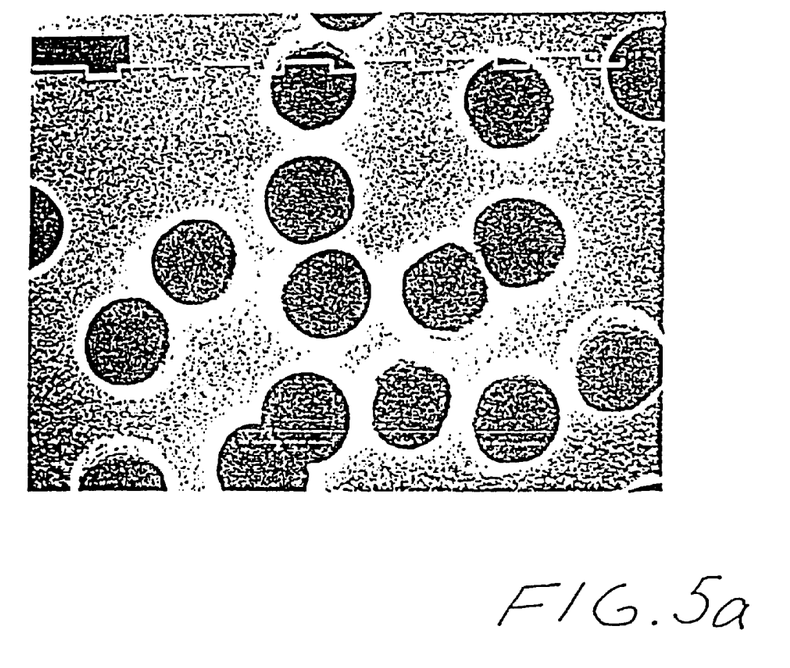
FIGS. 5a and 5b show a front view and a cross sectional perspective view of enlarged photos, that are made with differing enlargements, representing a typical PTM/TeM filtering film applied in the water purification device.
Figure 5B:
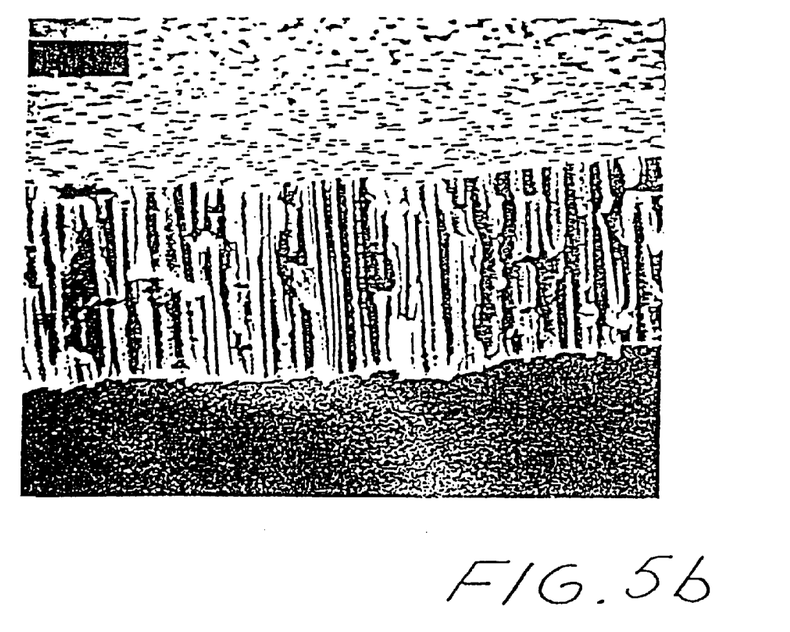

FIGS. 5a and 5b show a front view and a cross sectional perspective view of enlarged photos, that are made with differing enlargements, representing a typical PTM/TeM filtering film applied in the water purification device, the film being manufactured by irradiating and etching a basic plastic foil. By using the type of thin filtering film 1a' described above, the pressure drop caused by the filtering means 1a may be effectively minimized, whereupon the water purification device according to the invention functions effectively enough even with syphon height distinctly smaller than two meters. This is one reason why the water purification device according to the invention is thus applicable for the most heterogenous circumstances starting from usual housekeeping purposes up to extremely difficult circumstances as an easily introduceable and reliable water purification device. Furthermore the flow of a water purification device according to the invention is, when advantageously constructed, multiple in relation to for example a ceramic filter, besides the manufacturing costs of which is multiple in relation to a water purification device according to the invention.

Figure 1:
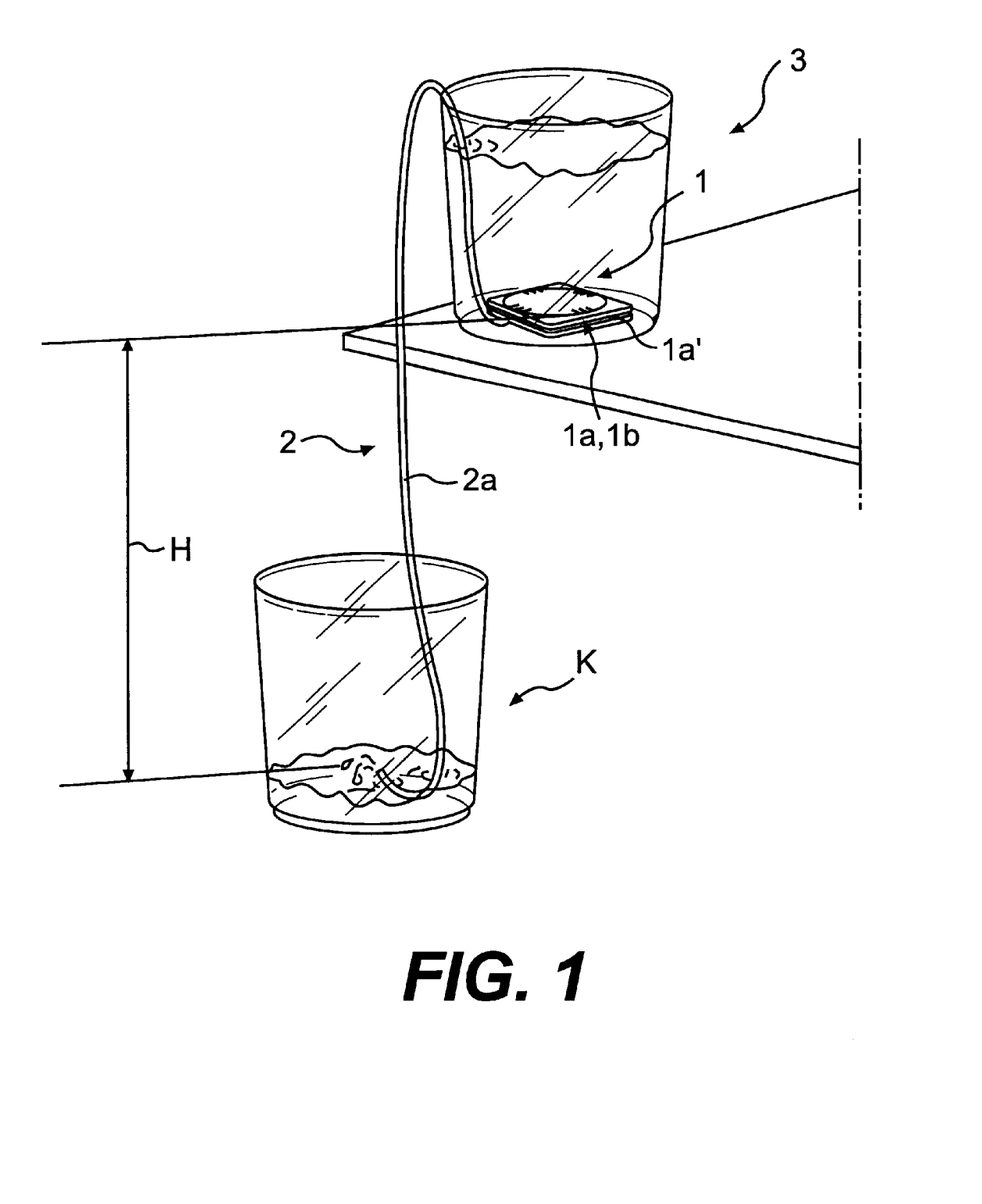
FIG. 1 shows an advantageous principle of a water purification device according to the invention.
Figure 2:
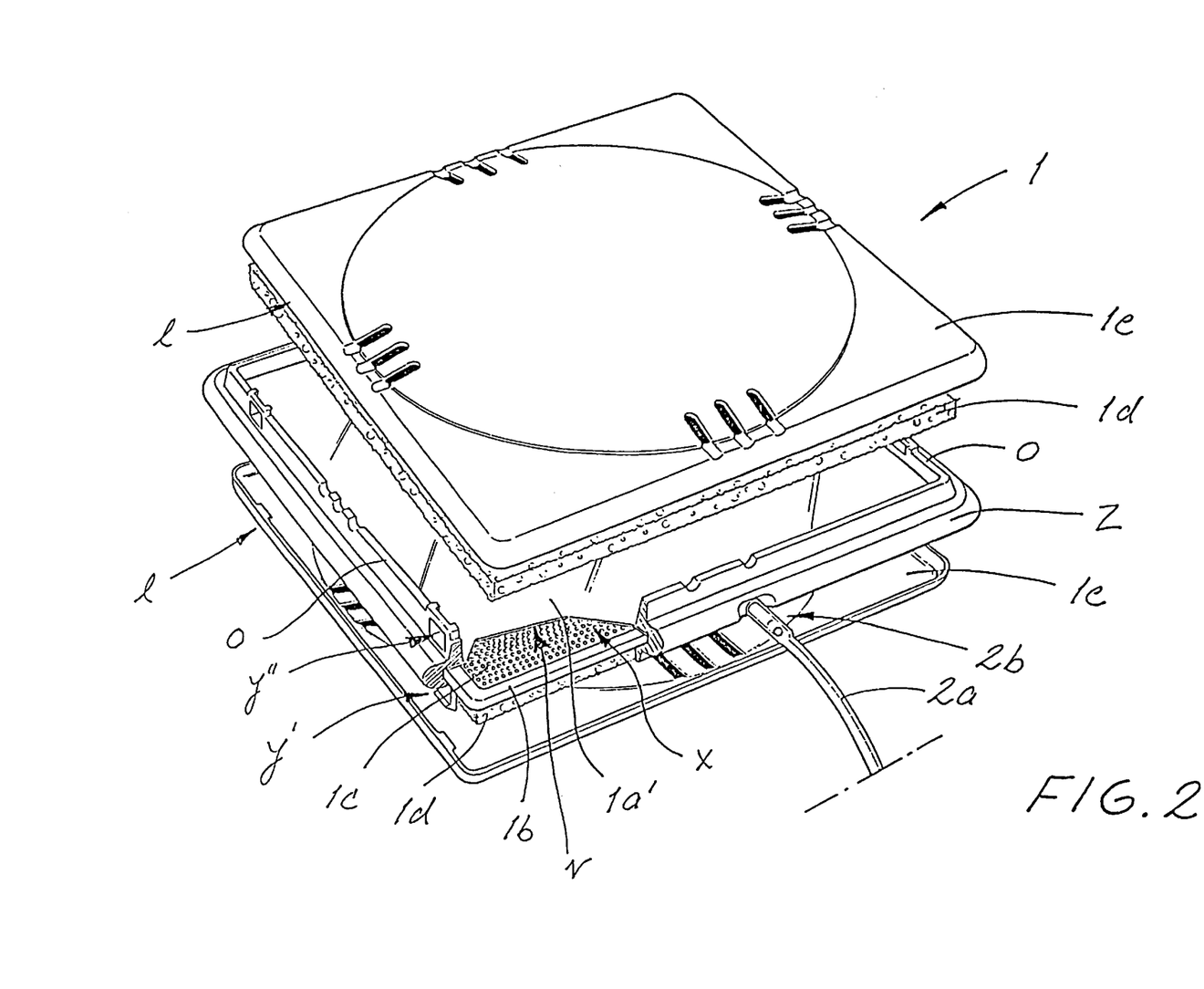
FIG. 2 shows a perspective and blasting view of an advantageous water purification device functioning with the above principle.
Figure 3:
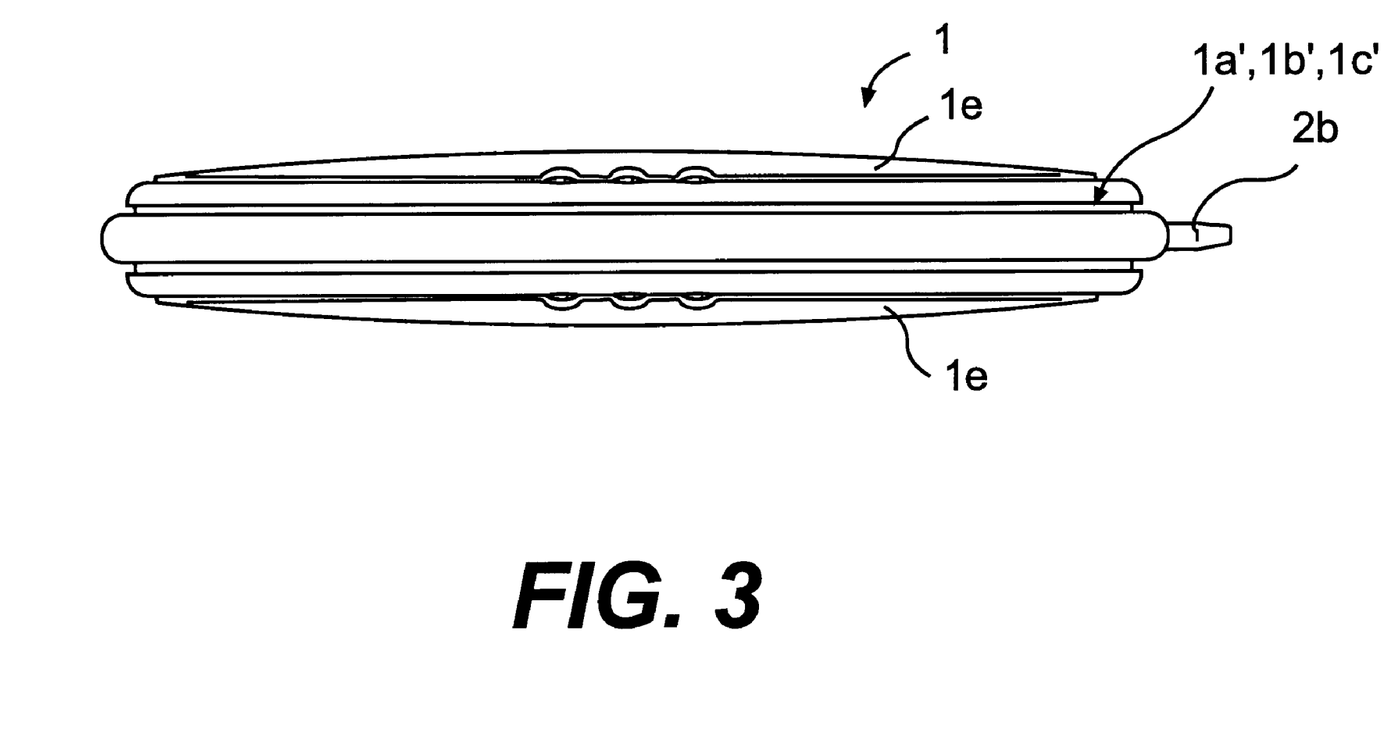
FIG. 3 shows a sideview of a device according to FIG. 2.

In the advantageous water purification device presented particularly in FIGS. 1–3 the filtering means 1a include an essentially plane shaped filtering film 1a', whereby there has been arranged an essentially plane shaped supporting frame 1c in connection with the auxiliary frame 1b to support the filtering film 1a'. The supporting frame 1c in question is necessary particularly because of the thinness of the filtering film 1a', that is also willing to rip off.

Figure 4:
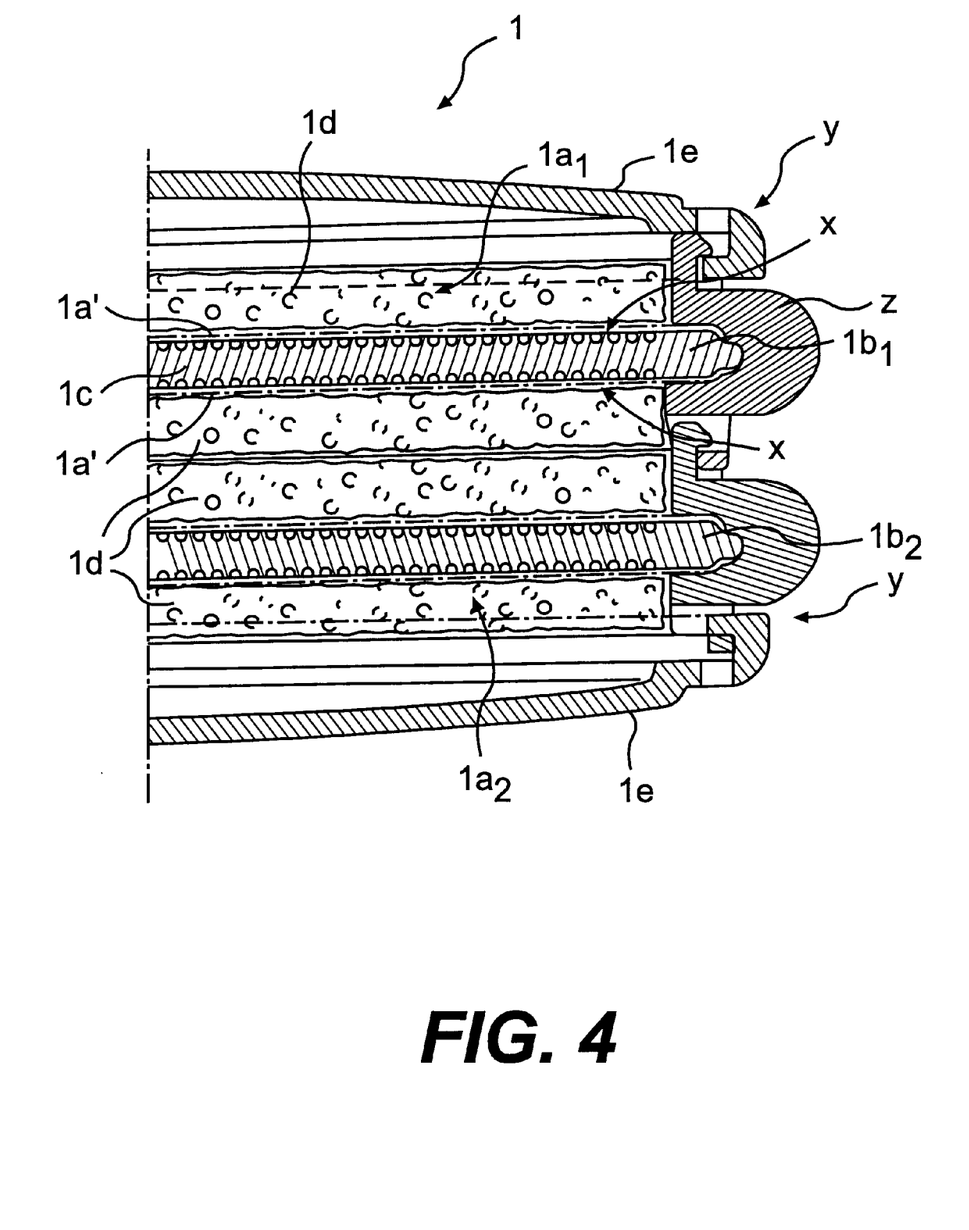
FIG. 4 shows a cross section of a detail, that contains some advantageous solutions in the water purification device.

With reference to the detail represented in FIG. 4, water, that has passed through the filtering film 1a', is led advantageously between the filtering film 1a' and the supporting frame 1c through an output pipe fitting 2b existing in the auxiliary frame 1b into the flow pipe 2a. In the water purification device according to FIGS. 2–4, on both opposite outer surfaces of the supporting frame 1c there has been arranged a surface patterning of projections x, as shown in FIG. 4, to form a flow space between filtering films 1a' next to the outer surfaces of the same and the supporting frame 1c. Furthermore as an advantageus embodiment on the filtering films 1a', that are placed on both opposite outer surfaces of the supporting frame 1c, there has been arranged a porous and flexible auxiliary part 1d preferably made of plastic based material, such as foam plastics or the like. The auxiliary part 1d stabilizes effectively flow conditions on the surfaces of the filtering film 1a', in addition to which it acts as a so called preliminary filter. The part in question may be also applied to wipe the filtering film 1a' when cleaning the device.

With reference to FIGS. 2 and 3 the auxiliary frame 1b of the water purification device comprises a casing structure, that surrounds the purification unit 1, to enable cleaning of internal parts of the purification unit 1, such as the filtering film 1a', there has been arranged at least casing parts 1e in connection with the auxiliary frame 1b, that may be detached. The casing parts 1e are connected to the edge z of the auxiliary frame 1b advantageously by quick-release principle functioning form-clamping arrangement y. Thus the purification unit 1 consists of one (or several as shown in FIG. 4) auxiliary frame 1b, that has an output pipe fitting 2b for the flow pipe 2a of the pipe unit 2, two filtering films 1a' placed on opposite sides, a supporting frame 1c for the filtering films, that has a tuberculation x, auxiliary parts 1d placed next to the filtering films and furthermore a casing part 1e, that is attached by form-clamping arrangement and, that surrounds the entirety described above on opposite sides.

The form-clamping arrangement is carried out advantageously so, that both the undermost and uppermost casing parts 1e and naturally each auxiliary frame 1b applied in the device are equal. In this case on both sides of the auxiliary frame 1b there is a guiding projection o, that goes along the edges of the same, against which the edges of the casing part 1e are placed. As an advantageous embodiment to achieve a form-clamping joint, on one side of the auxiliary frame 1b there are so called male couplings y' and on the opposite side there are corresponding female couplings y", whereby on the attachment edges l of the casing part 1e corresponding surfaces have been arranged, that fit both the male and the female couplings.

Figure 6A:
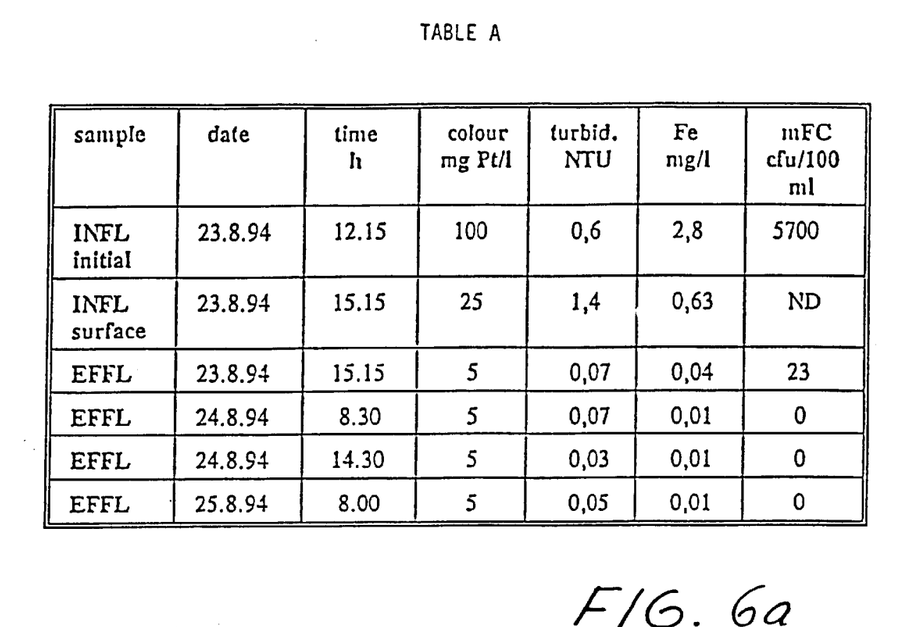
FIGS. 6a and 6b show as tables A and B measuring results, that represent the functioning of a water purification device according to the invention.

Table A shows results of the functioning of one kind of a water purification entirety according to the above, in which the pores size in the filtering film was 0.2 micrometer. From the results can be seen, that the water purification device operates very effectively particularly for the part of bacteria filtration, whereby the filter lets through bacteria to some extent only at the introduction stage (column/mFc=23). After a certain operating time the penetration of bacteria is totally terminated.

The above described basic construction has been developed further due to continuous research and development activities, whereby furthermore a construction, that is as an example equipped with two filtering means 1a1, 1a2, as shown in FIG. 4, has proved to be advantages. In this case each auxiliary frame 1b1, 1b2 and supporting frame 1c, that is an integrated part of the same, and also preferably on both opposite sides of the same existing filtering films 1a' are arranged as an integrated entirety, by arranging to the composition above preferably by heat treatment, preferably by injection molding an edge z, that closes tightly at least the edges of the auxiliary frame 1b1,1b2/the supporting frame 1c and the filtering films 1a'.

As an advantageous embodiment, the filtering film 1a' is strengthened preferably by lamination on at least one of its outer surface, such as on the one facing the supporting frame 1c, a strengthening layer v preferably being made of non-wowen material.

The above constructions enable use of bigger pore size in the filtering film than in the earlier basic construction, which may be most advantageously between 0.2–0.6 micrometer. In this case the pore density is preferably $5 \times 10^8$ $5 \times 10^7$ pores/cm$^2$. Furthermore a plastic based material, preferably such as polyethylene/polypropylene or the like is being used as the strengthening layer v, the weight of which is 15–50 g/m$^2$.

Particularly according to the principle shown in FIG. 1, the purification unit 1 of the water purification device is arranged to be totally immersed into the water. In this case the purification unit 1 is manufactured at least as a whole with its specific weight heavier than water, whereby the purification unit 1 may advantageously be kept on the bottom of the storage 3. In this case the purification unit 1 according to the invention and comprising the auxiliary frame 1b, supporting frame 1c and the casing parts 1e, is preferably made of plastic material, the specific weight of which is essentially>1000 kg/m$^3$.

Figure 6B:
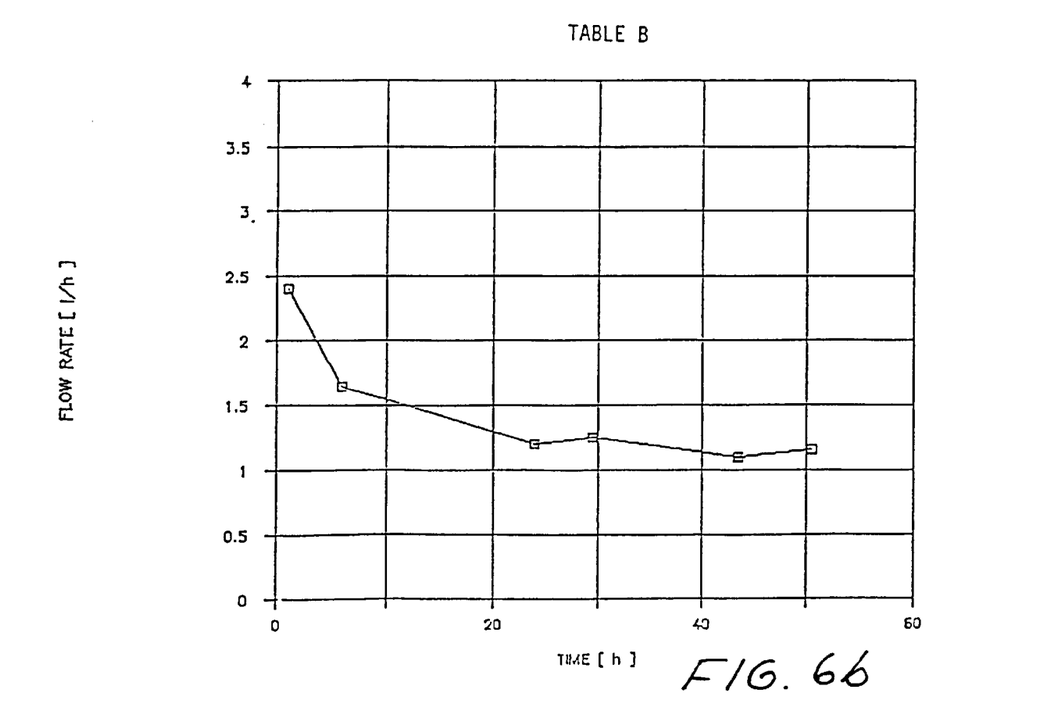
Figure 7A:
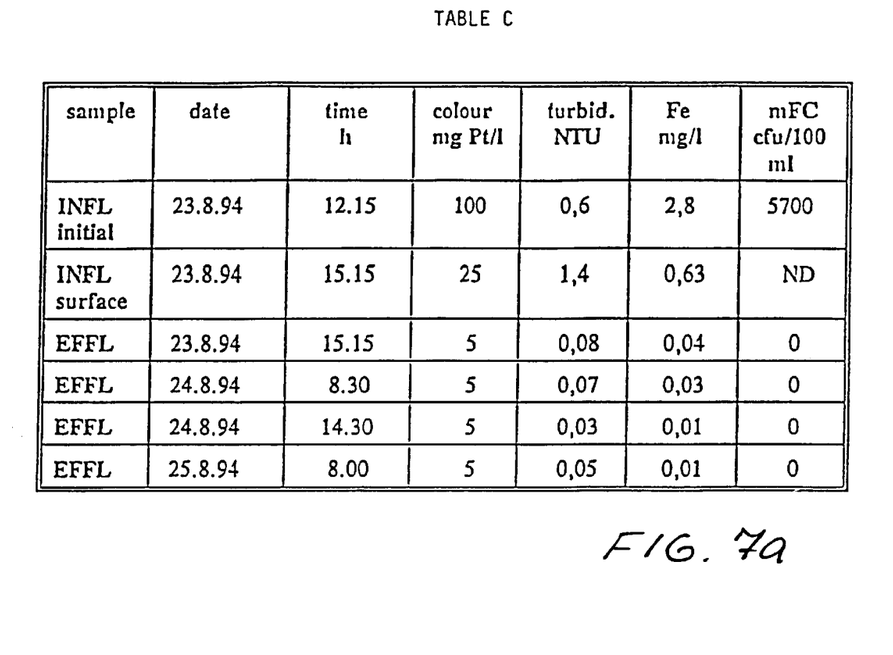
FIGS. 7a and 7b show as tables C and D corresponding measuring results, that represent the functioning of a water purification device being more developed in some parts.
Figure 7B:
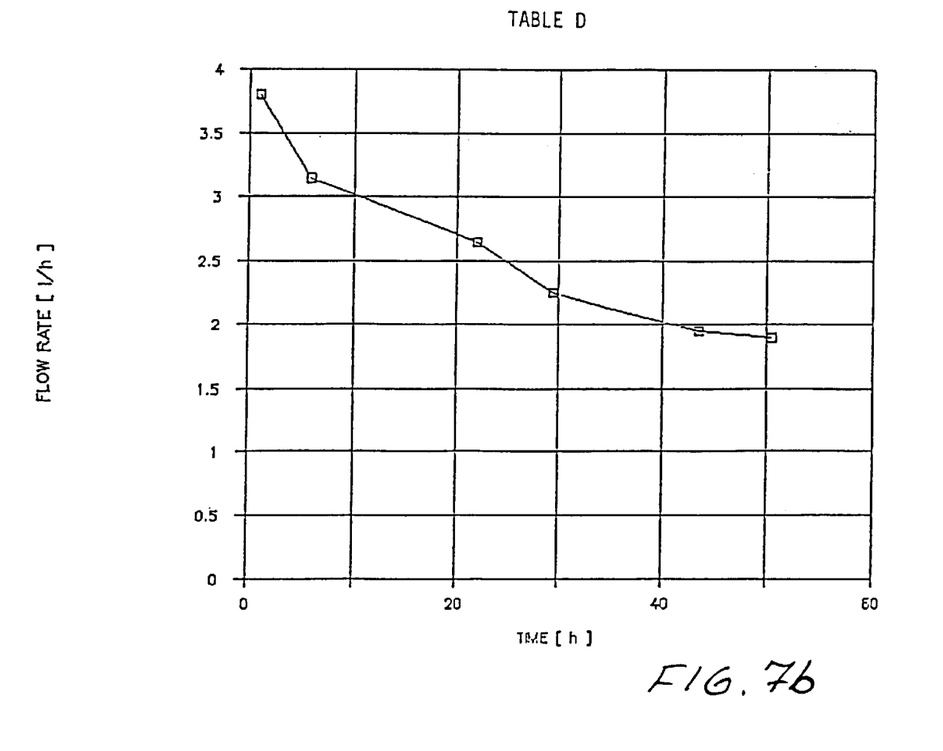

Based on table C, in which case the pore size in the filtering film of the purification device thus studied was 0.4 micrometer, it can be seen, that with the above constructions a remarkable improvement in the functional capacity of the water purification device has been achieved, whereby the water purification device does not let through any bacteria at any stage. Furthermore based on tables B and D, in which the output capacities (l/h), with a value of 1450 mm of the syphon height (H), of the water purification devices have been represented graphically, it can be seen, that the flow of the water purification device is considerably improved in relation to the earlier solution, which is due to the bigger pore size in the filtering film 1a' and the stiffer structure of the same, whereby a bigger flow space is left between the filtering film 1a' and the supporting frame 1c, both matters made possible by the developed new construction.

When the water purification device was arranged to be totally immersed in the water, as described above, the functioning of the water purification device according to the invention was further improved in relation to the earlier corresponding solution, that was arranged to partially float on the water. The floating water purification device was found in certain situations, when the water level was getting lower, to "gulp" air in the pipe unit of the same, which naturally decreases the output capacity of the device. In case too much air passes to the pipe unit, the functioning of the device may in certain situations be terminated permanently. The functioning of a totally immersed water purification device keeps on going in a stable way as long as there exists water in the water container. Particularly from table D can be seen, that with a water purification device according to the invention, an output capacity at its best nearly four times the output capacity particularly of a ceramic purifier may be achieved.

It is obvious, that the invention is not limited to the embodiments presented or described above, but it can be modified to a great extent within the basic idea. In this case it is in principle naturally possible to take advantage of the syphon principle so, that only the pipe unit of the water purification device is immersed in the water and the purification unit is arranged in connection with the collecting container. Naturally a solution of this kind is much more difficult than the one described above in both its construction and use. Naturally, in addition to the PTM, TeM films, also possibly other films, that are suitable for this purpose may be utilized. When utilizing for example a thin filtering film as mentioned before, the supporting frame may also have a water permeable wall, thus being formed of a net, grating or the like. This kind of a construction may not correspond with the embodiment represented above particularly in the sense of manufacturing costs, which is firstly due to that, that for example a metal constructed supporting frame may become rusty, and, when being made of material good enough or correspondingly of plastics, become too expensive. The pipe unit, that goes over the edge of the storage may correspondingly be stiffly constructed, which, however, limits the applicability of the device for different kind of circumstances. In this respect, when using flexible pipes as described above, the water purification device may be utilized in most heterogenous circumstances, whereby furthermore the interruption of water flow may be carried out simply by folding the end of the flow pipe.

What is claimed is:

1. A water purification device including:

a purification unit; and a pipe unit to lead water, the pipe unit including at least one flexible pipe connected to the purification unit, the water purification unit being immersed at least partially into water contained in a storage container, the water being led from the storage container into a collecting container located underneath the storage container by means of a syphon pressure caused by a height difference between the purification unit and the collecting container;

the purification unit comprising:

a filter for purifying the water and including at least one thin, plane shaped filtering film made of plastic based material, being one of a Partial Track Membrane and a Track-etch Membrane, the filtering film having a thickness of about 7–25 micrometers and pores sized about 0.05–10 micrometers; and an auxiliary frame having supporting frame for supporting the filter, the supporting frame formed of a rigid plate structure covered by the filtering films and having two opposite imperforate and essentially plane-shaped supporting side surfaces to which the filtering films are hermetically fastened, each supporting surface having a plurality of projections for forming a flow space between the filtering film and the supporting surface to lead water, that has passed through the filtering film, between the filtering film and the supporting surface through an output pipe fitting provided in the auxiliary frame into the pipe unit, wherein outer surfaces of the filtering films facing away from the opposite supporting surfaces are each covered by a respective casing part, wherein the casing parts are releasably connected to the auxiliary frame by quick-release means in order to enable cleaning of the purification unit.

2. Water purification device according to claim 1, wherein a porous and flexible auxiliary part made of plastic based material is arranged on respective outer surfaces of the filtering films that face away from the respective supporting surfaces.

3. Water purification device according to claim 2, wherein said porous and flexible auxiliary part is formed of is foam plastic.

4. Water purification device according to claim 1, wherein at least the auxiliary frame, supporting frame and filtering films are made as an integrated part, by arranging an injection molded edge that closes tightly edges of at the auxiliary frame, the supporting frame, and the filtering films.

5. Water purification device according to claim 4, wherein the size of pores in the filtering film is 0.2–0.6 micrometers, and the pore density is $5\times10^8$–$5\times10^7$ pores/cm$^2$.

6. Water purification device according to claim 5, wherein a plastic based material used as a strengthening layer on the filtering film, is polyethylene or polypropylene having the weight of 15–50 g/m$^2$.

7. Water purification device according to claim 1, wherein the purification unit is manufactured at least as a whole with its specific weight heavier than water to enable keeping of the purification unit essentially under water by manufacturing the supporting frame and the casing parts of plastic material having a specific weight that is less than 1000 kg/m$^3$.

8. A process for filtering water comprising the steps of:

providing the water purification device of claim 1;

passing un-filtered water from the storage container through the filtering film from an upstream side of the filtering film adjacent the un-filtered water in the storage container to a downstream side of the filtering film to produced filtered water;

passing filtered water from the downstream side of the filtering film into the flow space;

passing filtered water from the flow space into the outlet pipe fitting;

passing filtered water from the outlet pipe fitting into the pipe unit; and, passing filtered water from the pipe unit into the storage container.

* * * * *